(12) United States Patent
Atsumi (10) Patent No.: US 6,927,934 B2
(45) Date of Patent: Aug. 9, 2005

(54) MAGNETIC DISK APPARATUS

(75) Inventor: Takenori Atsumi, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 10/436,270

(22) Filed: May 13, 2003

(65) Prior Publication Data

US 2003/0214749 A1 Nov. 20, 2003

(30) Foreign Application Priority Data

May 14, 2002 (JP) ........................................ 2002-138191

(51) Int. Cl.$^7$ ............................................ G11B 5/596
(52) U.S. Cl. ...................................... 360/77.08; 360/75
(58) Field of Search ................................. 360/75, 77.08, 360/78.09

(56) References Cited

U.S. PATENT DOCUMENTS 6,819,522 B2 * 11/2004 Atsumi et al. ............ 360/78.06

FOREIGN PATENT DOCUMENTS

| JP | A-5-298842 | 11/1993 |
| JP | 09-073618 | * 3/1997 ............ G11B/5/54 |

* cited by examiner

*Primary Examiner*—David Hudspeth
*Assistant Examiner*—K. Wong
(74) *Attorney, Agent, or Firm*—Antonelli, Terry, Stout & Kraus, LLP (57) ABSTRACT

A magnetic disk apparatus includes a following compensator for measuring a frequency characteristic of an under-control object to stabilize a vibration mode of the under-control object with phase condition and a resonance filter having a resonance point in the vicinity of a frequency at which positioning accuracy is to be enhanced, being coupled in parallel to the under-control object. Polarity of mode constant of the resonance filter is so determined as to stabilize a vibration mode brought about by the resonance filter on the basis of a relation between the frequency stabilized by a control system and the phase-180° crossover frequency. Positioning accuracy at a specific frequency can be enhanced without involving unstability in the control system even in a frequency range where sensitivity function of the control system is higher than 0 dB inclusive.

3 Claims, 13 Drawing Sheets

FIG.8B
Cpf (z)

FIG.9A $C_{pf} \cdot P(z)$

LOCUS OF $C_{pf} \cdot P(z)$

FIG.21A $P(z) \cdot Cf(z)$

MAGNETIC DISK APPARATUS

BACKGROUND OF THE INVENTION

The present invention relates to a positioning control apparatus suited for positioning accurately a magnetic head in a magnetic disk apparatus.

In the magnetic disk apparatus to be employed as an external storage unit of a computer, a magnetic head is caused to follow a target track on a magnetic disk surface for performing recording/reproduction of data on/from the track. To this end, it is required to control the magnetic head so that it can be positioned on the target track with high accuracy. In recent years, there has arisen a trend of decreasing the track width in an effort for increasing the storage capacity of the magnetic disk apparatus. Under the circumstances, it is demanded to enhance or improve further the positioning accuracy as well as the seeking speed of the magnetic head.

As one of the factors of degrading the positioning accuracy, there can be mentioned vibration of a position signal making appearance in synchronism with rotation of the disk and external disturbance. Such vibration of the position signal has to be suppressed sufficiently and thus the control for suppressing adequately such vibration is required. As a technique to cope with this problem, there can be mentioned the one disclosed, for example, in JP-A-5-298842. This publication discloses a technique for positioning the magnetic head by following up eccentricity or decentering components contained in the position information. More specifically, according to the technique disclosed in this publication, a control signal is generated with the aid of a mathematical model having a resonance point at a vibration or oscillation frequency ascribable to the disk rotation, disturbance, etc. for suppressing the vibration, which control signal is then applied or added to a servo control signal for positioning the magnetic head.

With the technique disclosed in JP-A-5-298842 cited above, it is certainly possible to suppress the vibration components accompanying the rotation of the disk. However, when the frequency of the vibration lies within a frequency range in which the sensitivity function of the control system exceeds 0 (zero) dB, the control becomes unstable to undergo divergence, giving rise to a problem.

BRIEF SUMMARY OF THE INVENTION

In the light of the state of the art described above, it is an object of the present invention to provide a positioning control apparatus for a magnetic disk apparatus capable of suppressing the vibration without impairing the stability of a control system even when the frequency of the vibration to be suppressed lies in a frequency range in which the sensitivity function of the control system exceeds 0 (zero) dB.

In view of the above and other objects which will become apparent as the description proceeds, there is provided, according to an aspect of the present invention, a positioning control apparatus which is so arranged that for an under-control object comprised of an actuator, a head driven by the actuator and an extracting circuit for extracting a head position signal from information read out from an information recording/reproducing medium by the head, an operating signal is generated for controlling the head so that a head position indicated by the head position signal extracted by the extracting circuit coincides with a given target position. The positioning control apparatus mentioned above includes an error detecting unit for deriving difference between the target position and the head position in terms of an error signal, a compensator receiving as input thereto the error signal from the error detecting unit for thereby generating the operating signal mentioned above by carrying out phase compensation for stabilizing a vibration mode taking place in the under-control object, and a resonance filter receiving as input thereto the operating signal outputted from the compensator, the resonance filter having a resonance frequency at or in the vicinity of a given frequency at which positioning accuracy is to be enhanced, the output of the resonance filter being then added to the head position signal.

In the positioning control apparatus described above, such arrangement may preferably be adopted that in a vector locus which represents an open-loop transfer characteristic in the Nyquist diagram when the positioning control apparatus including the compensator and the resonance filter on one hand and the under-control object on the other hand are connected, the resonance filter has such characteristic that a circular locus is generated clockwise in the direction bearing away from an unstable point (−1, 0) in the Nyquist diagram as the frequency increases in the vicinity of the given frequency at which the positioning accuracy is to be enhanced.

Furthermore, in the positioning control apparatus described above, the resonance filter should preferably be imparted with such a transfer characteristic given by $$a/(s^2+2\zeta\omega s+\omega^2)$$

where a represents a mode constant, ω represents a value equal to a product of the resonance frequency multiplied by 2π, and ζ represents a viscosity coefficient.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIGS. 3A and 3B are views for graphically illustrating transfer characteristic of an under-control object, in which FIG. 3A shows a gain characteristic of the under-control object and FIG. 3B shows a phase characteristic of the same;

FIGS. 4A and 4B are views for graphically illustrating characteristic of a following compensator, in which FIG. 4A shows a gain characteristic of the following compensator and FIG. 4B shows a phase characteristic of the same;

FIGS. 7A and 7B are views for illustrating graphically characteristics of a resonance filter, in which FIG. 7A shows a gain characteristic of the resonance filter and FIG. 7B shows a phase characteristic of the same;

DETAILED DESCRIPTION OF THE INVENTION

Figure 2:
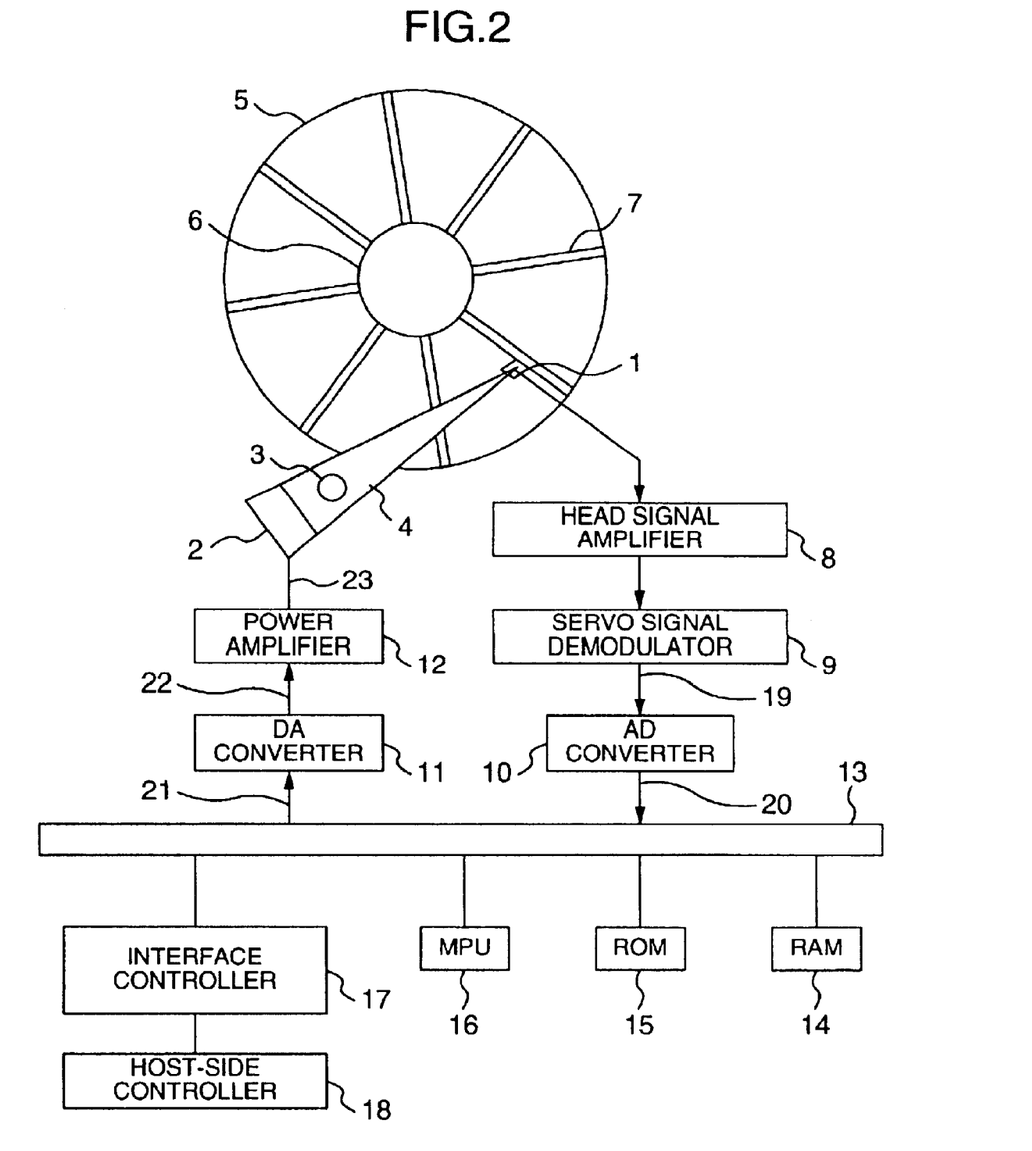
FIG. 2 is a functional block diagram showing a head positioning control system of a magnetic disk apparatus to which the present invention can find application.

The present invention will be described by reference to the drawings. FIG. 2 is a functional block diagram showing a head positioning control system of the magnetic disk apparatus to which the present invention can be applied. Referring to the figure, a magnetic disk 5 serving as a recording medium is fixedly mounted to a shaft of a spindle motor 6 so as to be rotatable at a predetermined rotation speed. A pivot bearing 3 is attached to a lateral side of the magnetic disk 5 mounted on the spindle motor 6 in parallel with the shaft of the spindle motor 6. A carriage 4 is swingably or pivotally mounted on the pivot bearing 3. A magnetic head 1 is fixedly mounted on the carriage 4 at a tip end thereof. A driving force for moving the magnetic head 1 is generated by a voice coil motor (VMC) 2. Signals such as position signal and others recorded in servo sectors 7 on the magnetic disk are detected by the magnetic head 1 and amplified by a head signal amplifier 8 to be subsequently demodulated by a servo signal demodulator 9. A servo signal 19 resulting from the demodulation is then converted into a digital signal through an analogue-to-digital or AD converter 10. The digital signal outputted from the AD converter 10 contains the digitized position signal 20. The position signal 20 acquired in this way is fetched by an MPU (Micro-Processor Unit) 16 by way of a bus 13.

The MPU 16 is provided with a ROM (Read-Only Memory) 15 and a RAM (Random Access Memory) 14 by way of the bus 13. Stored in the ROM 15 are various control programs executed by the MPU 16 and parameters required for various controls. Further connected to the MPU 16 through the medium of the bus 13 is an interface controller 17 which is designed to issue access requests for read/write operations to the MPU 16 in response to commands supplied from a host-side controller 18. Upon issuance of a data read/write request command, the MPU 16 executes a relevant positioning control program stored in the ROM 15 to thereby arithmetically determine a distance to a target position on the basis of the position signal 20 as inputted, whereby an optimal voice coil motor control signal (hereinafter referred to as the VCM control signal) 21 is generated in conformance to the distance as determined. The VCM control signal 21 generated is converted to a power amplifier control signal 22 through a DA converter 11 and then transformed to an electric current 23 by means of a power amplifier 12, the electric current 23 being then applied to the voice coil motor (VCM) 2. In this manner, the magnetic head can be positioned to the target position.

Figure 1:
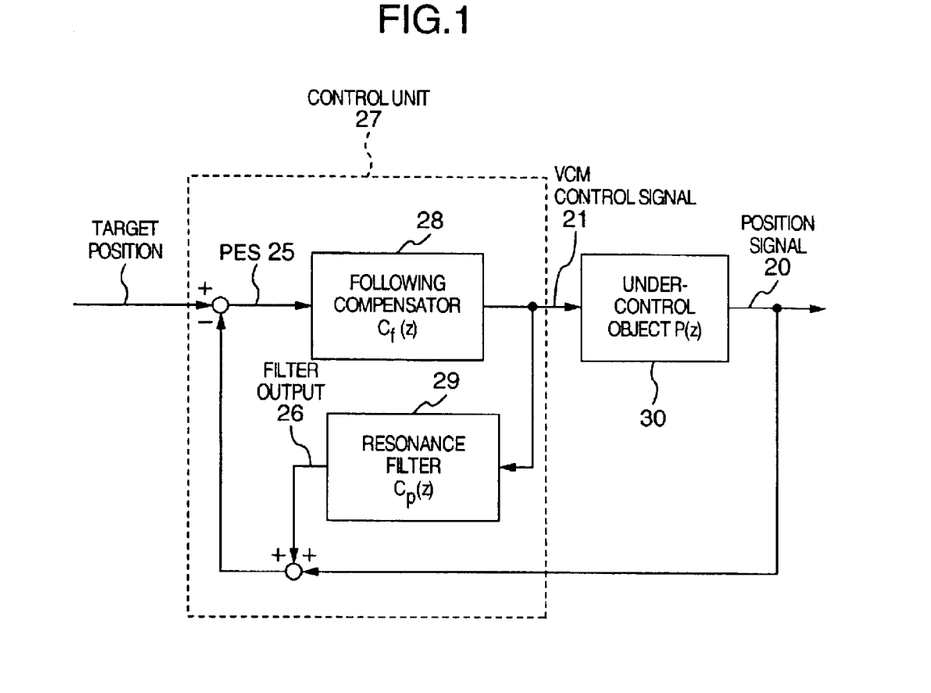
FIG. 1 is a block diagram showing an exemplary configuration of the positioning control apparatus according to an embodiment of the present invention.

In the head positioning control system shown in the functional block diagram of FIG. 2 and described above, the teachings of the present invention can be seen in the processing method executed by the MPU 16 for generating the VCM control signal 21 in response to the position signal 20 inputted. FIG. 1 is a block diagram showing an exemplary or typical arrangement of the positioning control apparatus according to an embodiment of the present invention. In FIG. 1, an under-control object (i.e., object to be controlled) denoted by reference numeral 30 represents comprehensively or corresponds to a portion or circuitry extending from the DA converter 11 to the AD converter 10 inclusive and designed for outputting the digitized position signal 20 in response to the input of the VCM control signal 21 generated by the MPU 16 through arithmetic processing, as described by reference to FIG. 2. The input/output characteristic of this circuitry, i.e., the under-control object 30, is represented by a transfer function P(z). Further, a control unit 27 shown in FIG. 1 is comprised of a resonance filter 29 (whose transfer function is represented by $C_p(z)$) taught by the present invention and a following compensator 28 (whose transfer function is represented by $C_f(z)$) for realizing desirable control performance. The following compensator 28 may be the one known in the art. In the arrangement shown in FIG. 1, when a command containing the target position is issued from the host-side controller, a position error signal (PES) 25 representing a differential signal between the target position and the position signal 20 is inputted to the following compensator 28, as a result of which the VCM control signal 21 is generated by the following compensator 28 to be inputted to the under-control object 30 and the resonance filter 29, whereon the filter output 26 of the resonance filter 29 is added to the position signal 20.

In this conjunction, it is noted that in the case of the arrangement disclosed in JP-A-5-298842 cited previously, the position error signal PES mentioned above is inputted to a mathematical model having a resonance characteristic, wherein the output of the mathematical model is also added to the position error signal PES. Thus, the mathematical model serves as a feed-forward compensator for the position error signal PES. On the other hand, the arrangement according to the present invention shown in FIG. 1 certainly bears similarity to the known technique disclosed in the publication mentioned above in respect that the resonance filter 29 has a resonance point at the frequency to be suppressed. However, the arrangement according to the present invention shown in FIG. 1 differs from the known art in the respect that the VCM control signal 21 outputted from the control unit 27 is inputted to the resonance filter 29, the output of which is fed back to be added to the position error signal PES for thereby compensating for the position error signal PES.

Now, description will be made in detail by reference to FIG. 1. At first, the under-control object 30 is considered to be a mechanics model $P_c(s)$ which is composed of a rigid-body mode and one vibration mode as given by the under-mentioned expression (1), being made discrete with the zero-order hold on the presumption that the control system concerned is a digital control system.

$$P_c(s) = \frac{1}{s^2} + \frac{a_r}{s^2 + 2\zeta_r\omega_r s + \omega_r^2} \quad (1)$$

Figure 3A:
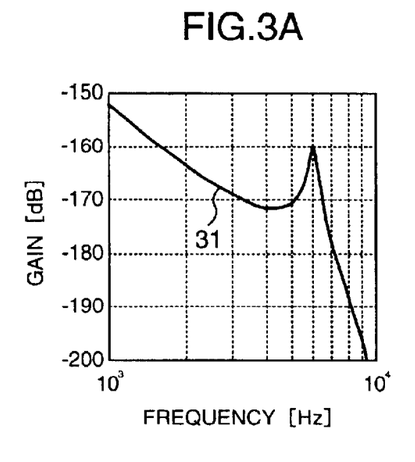
Figure 3B:
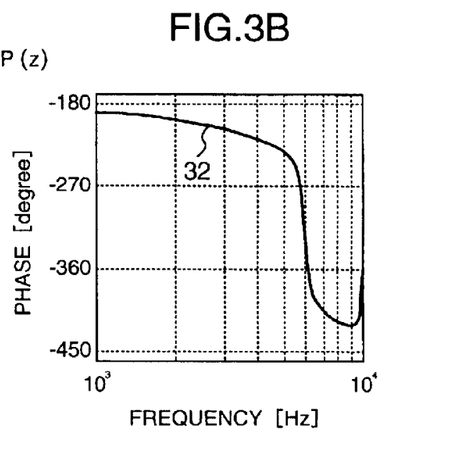

At this juncture, the sampling time is represented by Ts. Further, in the above expression, it is assumed, by way of example, that a mode constant $a_r$ is "$-1$", viscosity coefficient $\zeta_r$ is "0.03", resonance frequency $\omega_r/2\pi$ is "6000 Hz" and that the sampling time Ts is "50 $\mu$s". FIGS. 3A and 3B are views for graphically illustrating the transfer characteristic P(z) of the under-control object 30 on the above-mentioned assumption. More specifically, FIG. 3A shows gain characteristic 31 of the under-control object 30 while FIG. 3B shows phase characteristic 32 of the same. In this under-control object 30, the mode constant $a_r$ of the vibration mode is of negative polarity (minus) while mode constant of "1" of the rigid-body mode is of the opposite polarity (opposite phase). Incidentally, the resonance frequency $\omega_r$ mentioned above represents a natural vibration frequency of e.g. a carriage.

The following compensator 28 is so set as to exhibit, for example, such characteristics as mentioned below. Namely, in a low frequency range, integral characteristic of the first order is imparted to the following compensator so that no deviation of steady state takes place even in the case where an external force acts on the control system. Additionally, phase lead characteristic of the first order is imparted to the following compensator with a view to increasing the phase lead in the frequency range of 1 kHz to 2 kHz in order to stabilize the rigid-body mode. Furthermore, in order to stabilize the phase in the vibration mode, phase delay characteristic of the first order is imparted to the following compensator for thereby delaying the phase in the frequency range succeeding to 5 kHz. Besides, the proportional gain of the following compensator is so selected that such gain characteristic is imparted to the compensator in which the crossover frequency at gain of 0 (zero) dB in the open-loop transfer characteristic of the control system (i.e., the frequency at which the ratio between the input and output amplitudes is "1") is 170 Hz. In this conjunction, the transfer characteristic of the following compensator 28 is graphically illustrated in FIGS. 4A and 4B. More specifically, FIG. 4A shows the gain characteristic 33 of the following compensator while FIG. 4B shows the phase characteristic 34 of the following compensator.

Figure 4A:
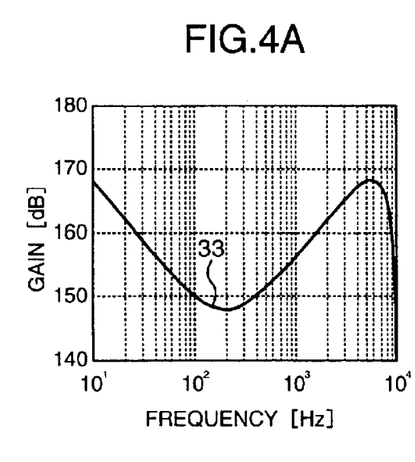
Figure 4B:
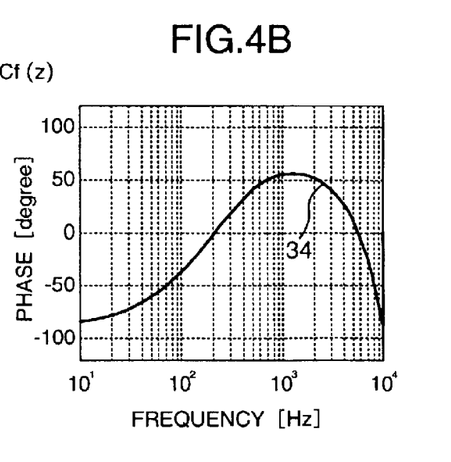
Figure 5A:
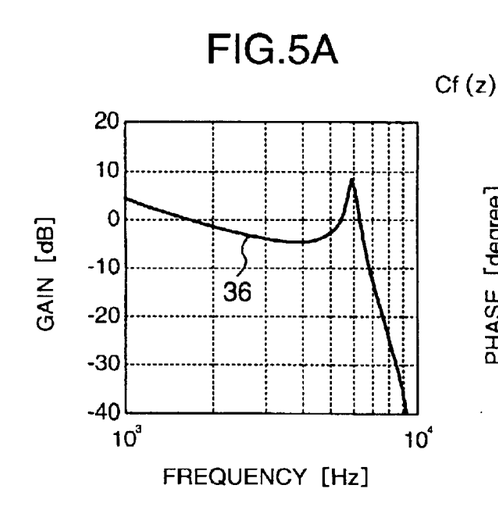
FIGS. 5A and 5B are views for graphically illustrating a gain characteristic and a phase characteristic, respectively, in the case where the under-control object having the characteristics shown in FIGS. 3A and 3B and the following compensator having the characteristics shown in FIGS. 4A and 4B are coupled in series to each other.
Figure 5B:
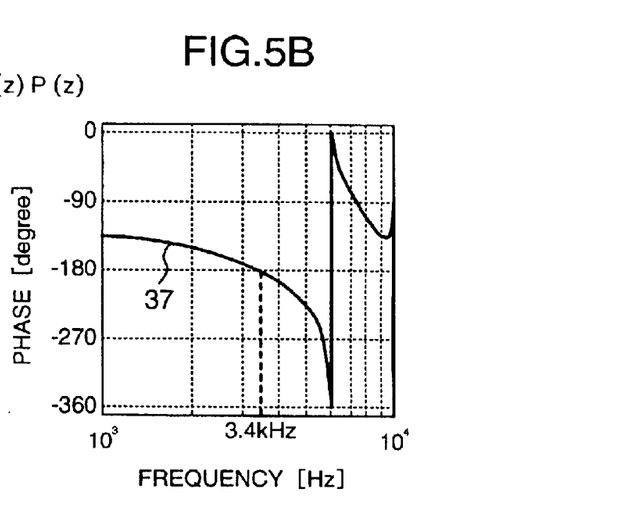
Figure 6:
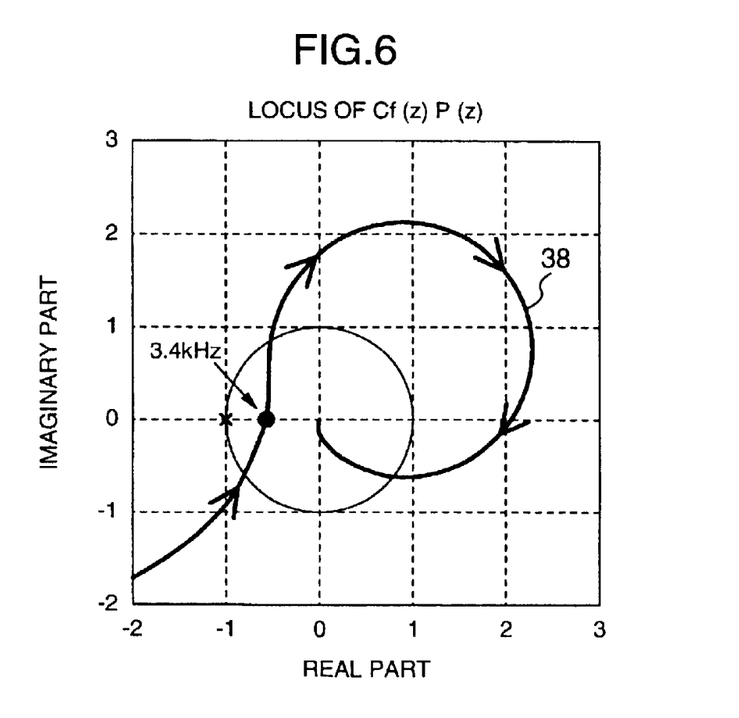
FIG. 6 is a view showing a vector locus of the characteristics shown in FIGS. 5A and 5B.

FIGS. 5A and 5B are views for graphically illustrating gain characteristic 36 and phase characteristic 37, respectively, of the open-loop transfer characteristic $C_f(z) \cdot P(z)$ in the case where the under-control object 30 having the characteristics shown in FIGS. 3A and 3B and the following compensator 28 having the characteristics shown in FIGS. 4A and 4B are coupled in series to each other. Further, FIG. 6 is a view for illustrating a vector locus 38 of the open-loop transfer characteristic $C_f(z) \cdot P(z)$ shown in FIGS. 5A and 5B in the Nyquist diagram. In the Nyquist diagram, the frequency at which the vector locus 38 intersects the real-part axis (i.e., the phase–180° crossover frequency) is 3.4 kHz. At the frequencies lower than the phase–180° crossover frequency (frequencies in the lower half plane), the mode in which the mode constant $a_r$ is positive or of plus polarity is stable, whereas at the frequencies higher than the phase–180° crossover frequency (frequencies in the upper half plane), the mode in which the mode constant $a_r$ is negative or of minus polarity is stable. Since the resonance frequency of the under-control object 30 having the characteristics illustrated in FIGS. 3A and 3B is given by $\omega_r/2\pi=6$ kHz, it can be seen that the vibration mode of the under-control object is stabilized so as to run in the upper half plane of the Nyquist diagram by means of the following compensator 28. In other words, for the natural vibration or the like of the carriage or the like, the head is so controlled by means of the following compensator as to perform the following operation stably.

Next, description will be directed to a structure and a designing method of the resonance filter 29 according to the present invention. It is presumed that the resonance filter 29 having the transfer characteristic $C_p(z)$ is realized by making discrete the second-order continuous time filter given by the undermentioned expression (2) with the zero-order hold and that the sampling time of the filter is Ts.

$$C_{pc}(s) = \frac{a}{s^2 + 2\zeta\omega s + \omega^2} \quad (2)$$

Figure 7A:
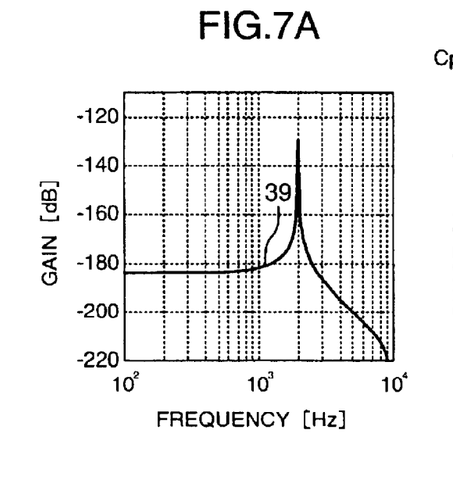
Figure 7B:
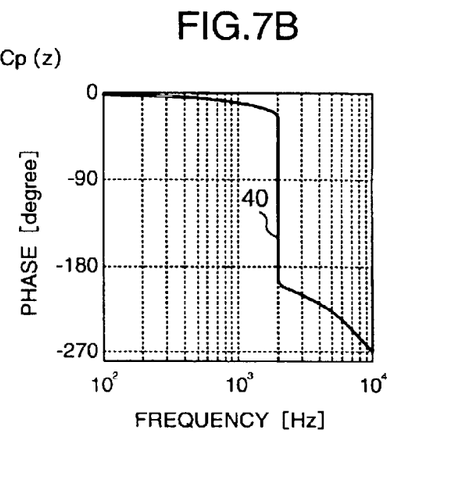

In the following, description will be made how to determine the coefficients a, $\zeta$ and $\omega$. At first, the positioning accuracy is to be enhanced. More specifically, the frequency at which the external disturbance due to the vibration or the like among others is to be suppressed is set to e.g. 2 kHz. Since the frequency of 2 kHz is lower than the phase–180° crossover frequency of 3.4 kHz shown in FIG. 6, the mode constant a is selected to be of plus polarity or positive so that the vibration mode of the filter assumes the opposite phase relative to the 6 kHz-vibration mode of the under-control object. Since magnitude of the absolute value of the mode constant a determines the frequency range to which the resonance filter exerts influence, it is determined in accordance with the frequency bandwidth for which the effect of the resonance filter is to be expected. At this juncture, the mode constant a is presumed to be set equal to "0.1" with the influence of the resonance filter being limited to around 2 kHz. Further, the viscosity coefficient ζ determines the peak gain of the resonance filter, and the effect of the resonance filter becomes more significant as the viscosity coefficient ζ becomes smaller. At this juncture, the viscosity coefficient ζ is assumed to be set equal to "0 (zero)". Further, the resonance frequency ω is so selected as to substantially coincide with the frequency at which the positioning accuracy is to be enhanced. However, the sensitivity function of the control system is not always compressed to a maximum extent at the frequency ω. Accordingly, a fine adjustment is required so that the sensitivity function is compressed to a maximum at the desired frequency. At this juncture, the resonance frequency ω is selected to be 2×π×1950 [rad/s] so that the sensitivity function becomes minimum at 2 kHz. On the above presumption, FIGS. 7A and 7B illustrate the transfer function $C_p(z)$ of the resonance filter 29. More specifically, FIG. 7A illustrates the gain characteristic 39 of the resonance filter 29 while FIG. 7B illustrates the phase characteristic 40 of the same.

The transfer characteristic of the control unit 27 shown in FIG. 1 which has the transfer characteristics $C_f(z)$ and $C_p(z)$ is thus given by the undermentioned expression (3).

$$C_{pf}(z) = \frac{C_f(z)}{1 + C_f(z)C_p(z)} \quad (3)$$

Figure 8A:
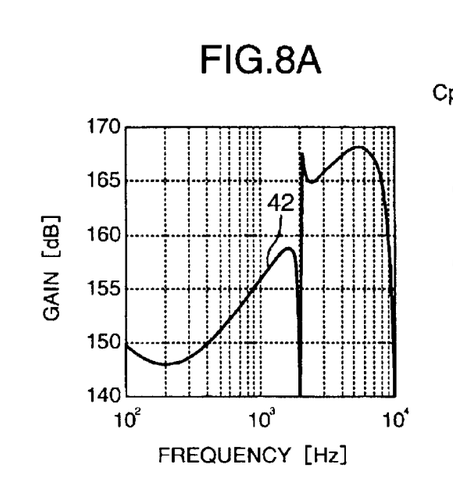
FIGS. 8A and 8B are views for graphically illustrating a gain characteristic and a phase characteristic, respectively, of transfer characteristic $C_{pf}(z)$ of a control unit.
Figure 8B:
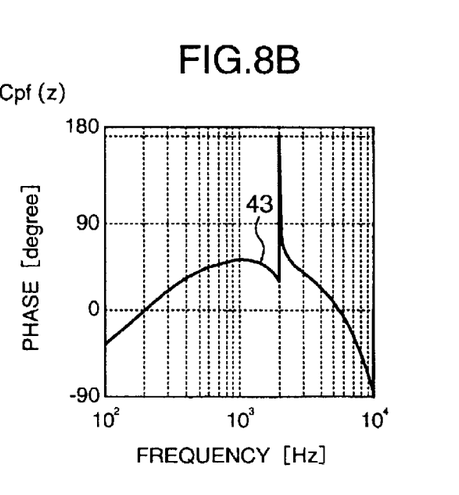

FIGS. 8A and 8B illustrates the transfer characteristic $C_{pf}(z)$ of the control unit 27 (gain characteristic 42 and phase characteristic 43) when the transfer characteristic $C_f(z)$ of the following compensator 28 is such as illustrated in FIGS. 4A and 4B and when the transfer characteristic $C_p(z)$ of the resonance filter 29 is such as illustrated in FIGS. 4A and 4B.

As can be seen in FIGS. 8A and 8B, owing to the presence of the resonance filter, the control unit 27 exhibits such phase characteristic 43 that the phase locally lags and thereafter locally leads around 1950 Hz which is the resonance frequency of the resonance filter 29. This can also be confirmed by subtracting the transfer characteristic of the under-control object from the open-loop transfer characteristic. Further, the open-loop transfer characteristic $C_{pf}(z)\cdot P(z)$ illustrated in FIGS. 9A and 9B also exhibit such phase characteristic that the phase locally lags and thereafter locally leads around 1950 Hz which is the resonance frequency of the resonance filter 29.

Figure 9A:
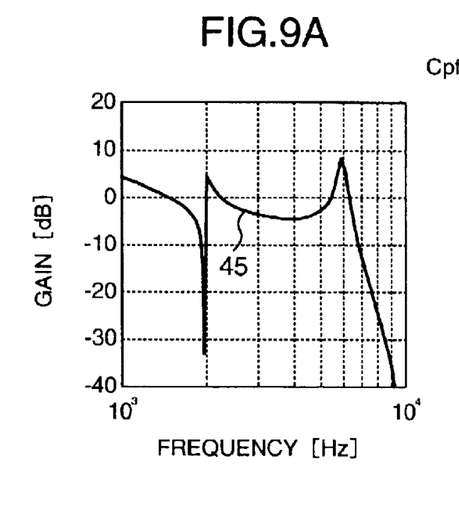
FIGS. 9A and 9B are views for graphically illustrating a gain characteristic and a phase characteristic, respectively, of open-loop transfer characteristic when the control unit having the characteristics shown in FIGS. 8A and 8B and the under-control object having the characteristics shown in FIGS. 3A and 3B are connected to each other.
Figure 9B:
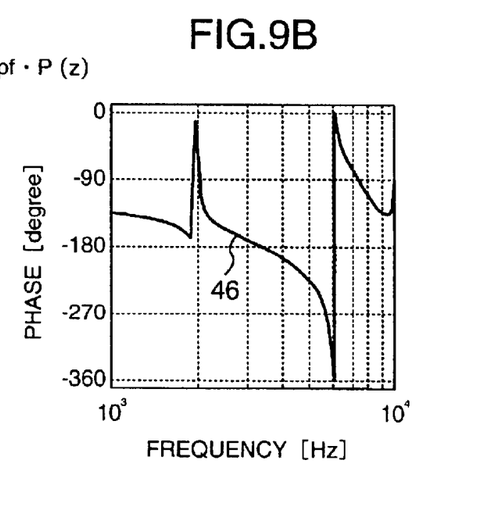
Figure 10:
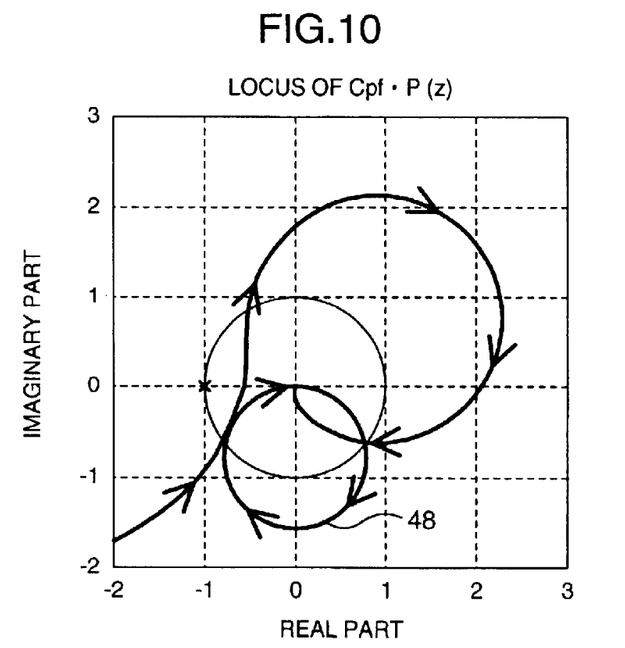
FIG. 10 shows a vector locus of the characteristics shown in FIGS. 9A and 9B.

FIG. 10 shows a vector locus representing the open-loop transfer characteristic shown in FIGS. 9A and 9B in the Nyquist diagram. The vector locus of the following compensator 28 (transfer characteristic $C_f(z)$) is such as illustrated in FIG. 6 when the resonance filter 29 is absent. By contrast, by providing additionally the resonance filter 29, a circular locus 48 is added to the locus shown in FIG. 6, as can be seen in FIG. 10. This added circular locus 48 makes appearance in the frequency range close to the resonance frequency at which gain of the resonance filter 29 increases and runs clockwise in the direction moving away from the coordinates (−1, 0) representing the unstable point for the characteristics illustrated in FIGS. 9A and 9B. Magnitude and shape of this circular locus change in dependence on the parameters of the resonance filter 29. However, what is most important in conjunction with the vector locus resides in that the circular locus making appearance newly owing to the addition of the resonance filter runs clockwise in the direction away from the coordinates (−1, 0) representing the unstable point. In this way, it is possible to improve the gain characteristic of the sensitivity function in the vicinity of the resonance frequency while sustaining the stability of the control system.

Figure 11:
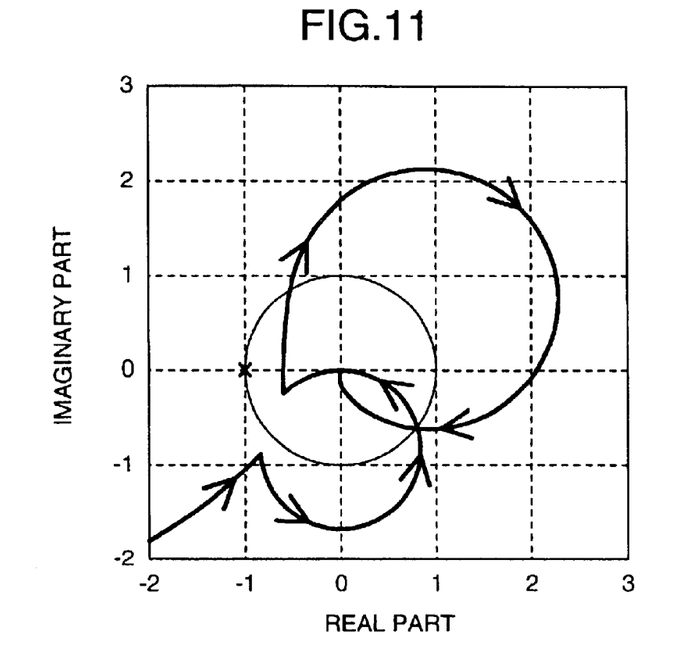
FIG. 11 shows a vector locus of the open-loop transfer characteristic when the sign of a vibration mode constant of the resonance filter having the characteristics shown in FIGS. 7A and 7B is inverted.
Figure 12:
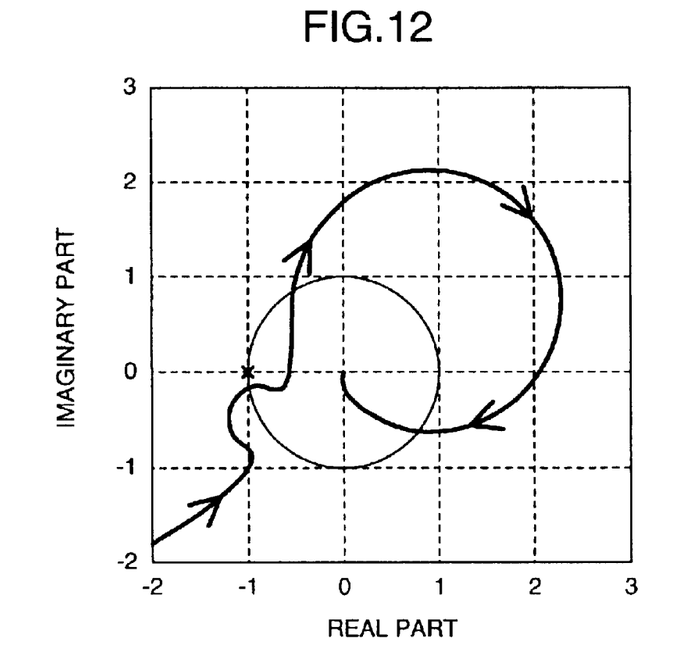
FIG. 12 shows a vector locus of the open-loop transfer characteristic corresponding to that shown in FIG. 11 when viscosity coefficient is further increased in the resonance filter.

At this juncture, let's assume that the mode constant a of the continuous time filter $C_{pc}(s)$ given by the expression (2) is negative (i.e., a=−0.1) while the other constants are same as those in the case of FIGS. 7A and 7B. In this case, the vector locus which the open-loop transfer characteristic traces is such as illustrated in FIG. 11. Thus, it can be confirmed that the open-loop transfer characteristic follows a circular arc counterclockwise in the vicinity of the resonance frequency of 1950 Hz. In this case, the control system becomes unstable. Further, in the case where the mode constant of the continuous time filter $C_{pc}(s)$ is negative (minus) with the viscosity coefficient being large (a=−1 and ζ=0.1), the vector locus 73 which is followed by the open-loop transfer characteristic $C_{pf}(z)\cdot P(z)$ is such as illustrated in FIG. 12. As can be seen in the figure, the open-loop transfer characteristic traces a circular arc clockwise in the direction toward the unstable point (−1, 0) in the vicinity of the resonance frequency of 1950 Hz. In this case, since the unstable point is not contained internally of the circular arc, the control system does not become unstable. However, gain characteristic of the sensitivity function undergoes remarkable deterioration around the resonance frequency.

Figure 13:
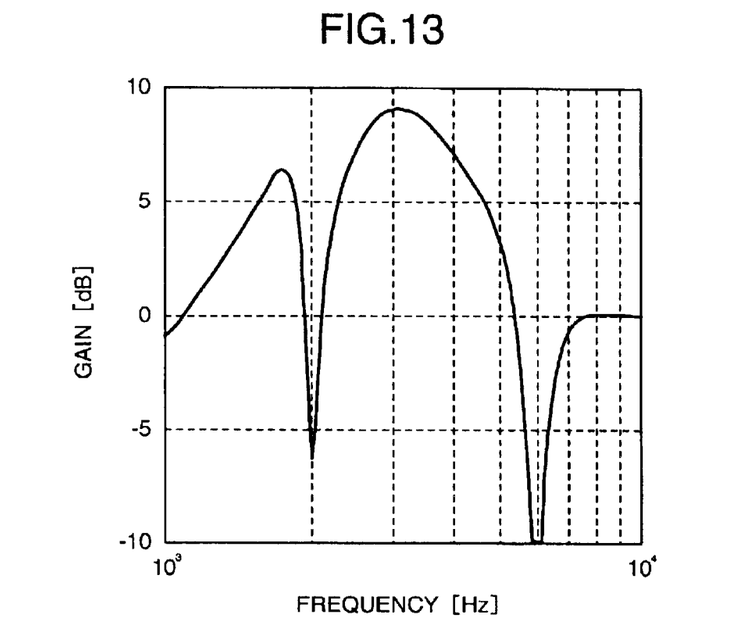
FIG. 13 is a view for illustrating graphically a gain characteristic of a sensitivity function corresponding to the open-loop transfer characteristics shown in FIGS. 9A and 9B.

FIG. 13 illustrates gain characteristic of the sensitivity function in the case where the resonance filter 29 having the characteristics illustrated in FIGS. 7A and 7B is applied. The sensitivity function mentioned above can be computed in accordance with the undermentioned expression (4).

$$\frac{1}{1 + P(z)C_{pf}(z)} \quad (4)$$

Figure 14:
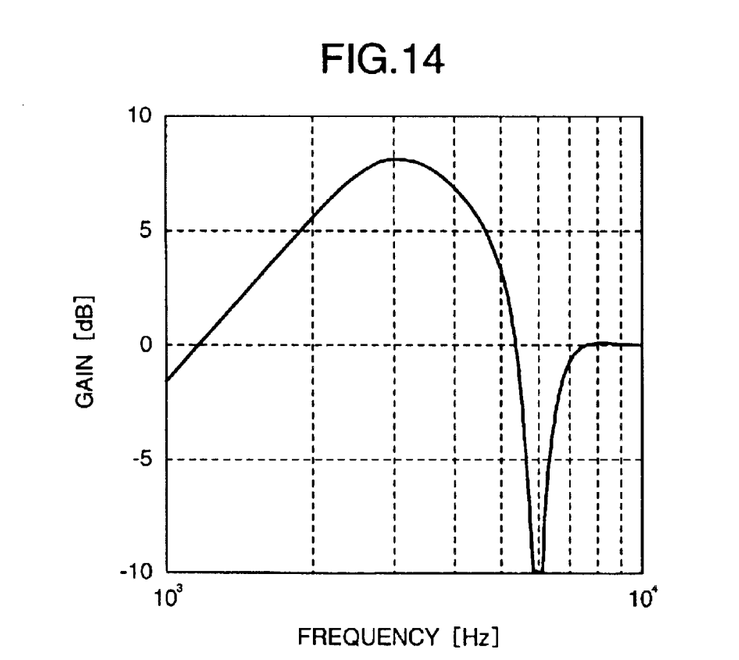
FIG. 14 is a view for illustrating graphically a gain characteristic of a sensitivity function corresponding to the open-loop transfer characteristics shown in FIG. 5.

For the purpose of comparison, gain characteristic of the sensitivity function in the case where the resonance filter is not applied is illustrated in FIG. 14. This sensitivity function can be computed in accordance with the following expression (5).

$$\frac{1}{1 + P(z)C_f(z)} \quad (5)$$

As is apparent from the comparison of FIG. 14 with FIG. 13, in the case illustrated in FIG. 14 where the teaching of the present invention is not applied, gain of the sensitivity function is about +6 dB in the vicinity of 2 kHz. Accordingly, at the frequency mentioned above, the system becomes unstable. By contrast, in the case illustrated in FIG. 13 where the teaching of the present invention is applied, the stability is sustained, as described previously, with gain of the sensitivity function being about −6 dB in the vicinity of the frequency of 2 kHz. Thus, it can be understood that when compared with the case where the teaching of the present invention is not applied (FIG. 13), the gain characteristic of the sensitivity function can be improved about 12 dB in the vicinity of the frequency of 2 kHz at which the control performance is to be enhanced.

Figure 15:
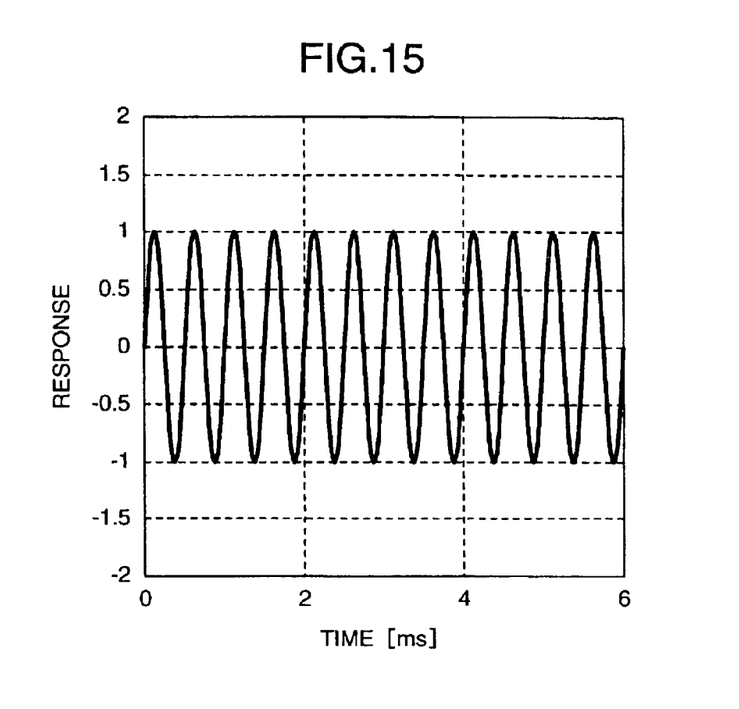
FIG. 15 is a view for illustrating graphically an example of sine-wave disturbance to a position signal.
Figure 16:
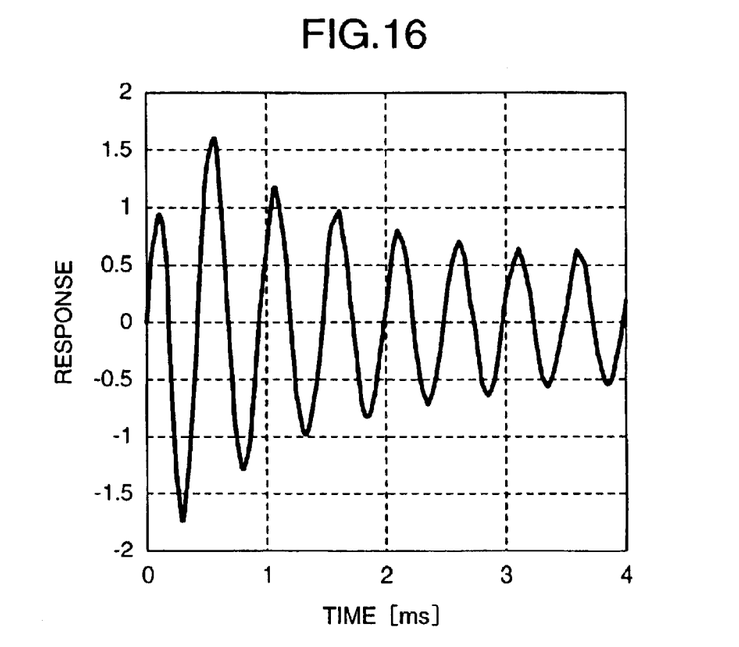
FIG. 16 is a view for graphically illustrating a time-dependent response behavior of the position signal to the disturbance signal shown in FIG. 15 when control is performed by the control unit having the characteristics shown in FIGS. 8A and 8B.
Figure 17:
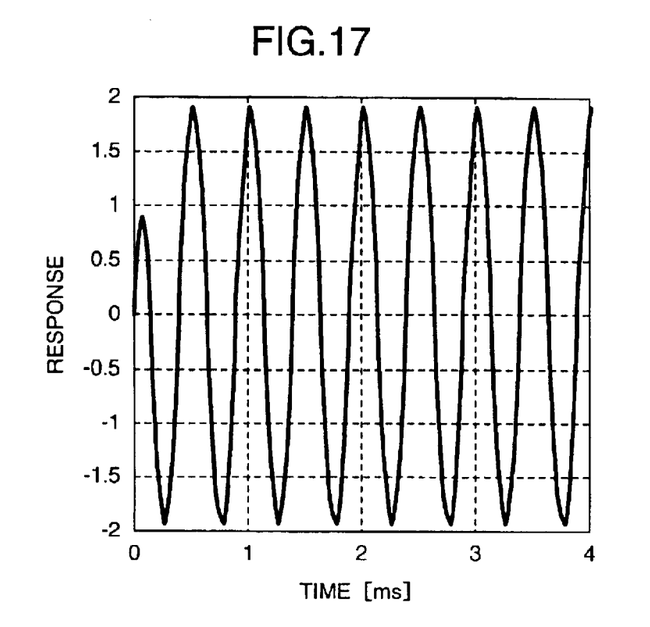
FIG. 17 is a view for graphically illustrating a time-dependent response behavior of the position signal to the disturbance signal shown in FIG. 15 when control is performed by the control unit having the characteristics shown in FIGS. 4A and 4B.

For the purpose of demonstrating the effects brought about by the present invention, the response behavior of the position signal 20 has been checked by applying as disturbance a sine wave signal having a frequency of 2 kHz and amplitude of "1" (see FIG. 15) on the presumption that the under-control object 30 exhibits the characteristics illustrated in FIGS. 3A and 3B. In this conjunction, FIG. 16 illustrates the response behavior in the case where the resonance filter described hereinbefore in conjunction with FIGS. 7A and 7B is employed, while FIG. 17 shows the response behavior when the resonance filter is not employed. It can be seen that when the present invention is applied, the response amplitude is improved by a factor of about "¼" after the time point of 3 ms when compared with a case where the teaching of the present invention is not adopted.

Figure 18A:
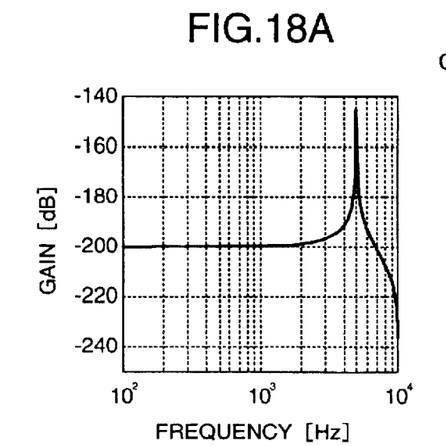
FIGS. 18A and 18B are views for illustrating graphically other examples of the gain characteristic and the phase characteristic, respectively, of the resonance filter.
Figure 18B:
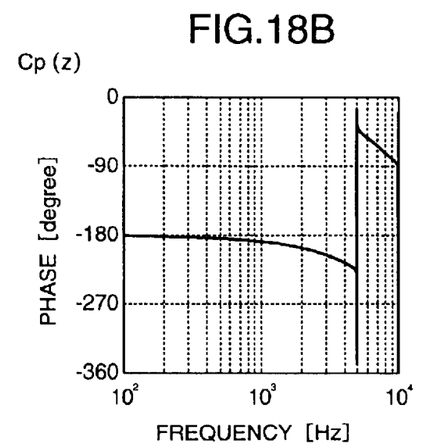

In the foregoing, description has been made as to the characteristic of the resonance filter 29 for further enhancing the control characteristic at the frequency of around 2 kHz in conjunction with the control of the under-control object 30 exhibiting the characteristics illustrated in FIGS. 3A and 3B by means of the following compensator 28 having the characteristics illustrated in FIGS. 4A and 4B. In the following, on the assumption that the under-control object and the following compensator are same as above, description will be made of the characteristic required for the resonance filter when the frequency at which the positioning accuracy is to be improved is set to 5 kHz which is higher than the phase−180° crossover frequency. In this case, since the frequency of 5 kHz is higher than the phase−180° crossover frequency, the mode constant a of the expression (2) is set to a negative value, e.g. a=−0.1, so as to realize the same phase with the vibration mode. Further, the viscosity coefficient ζ is set to "0" while the resonance frequency ω is set to "2×π×5050 [rad/s]". Consequently, the characteristic $C_p(z)$ of the resonance filter in this instance is illustrated in FIGS. 18A and 18B. More specifically, FIG. 18A illustrates the gain characteristic 61 of the resonance filter while FIG. 18B illustrates the phase characteristic 62 of the same.

Figure 19:
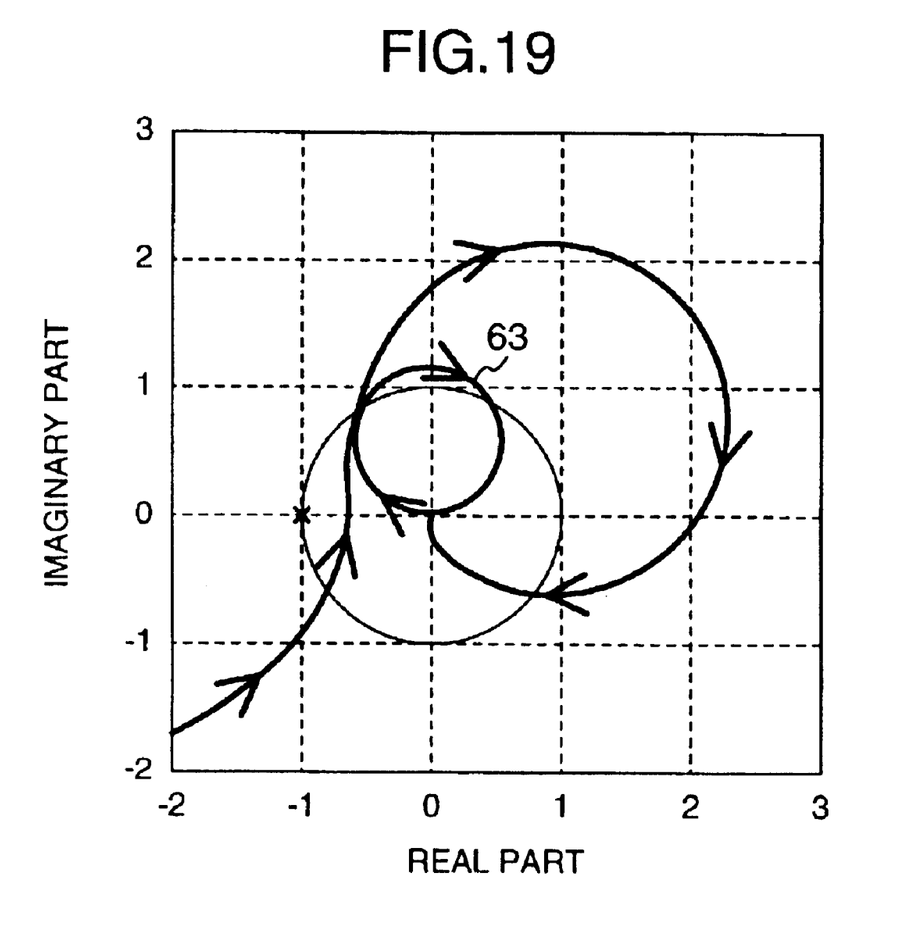
FIG. 19 is a view showing a vector locus of the open-loop transfer characteristic when the resonance filter having the characteristics shown in FIGS. 18A and 18B is applied.

FIG. 19 shows a vector locus of the open-loop transfer characteristic when the characteristic mentioned above is imposed to the resonance filter 29. This vector locus is essentially corresponds to the locus shown in FIG. 6 which is added with a circular locus 63. This circular locus 63 runs clockwise in the direction away from the coordinates (−1, 0) representing the unstable point. Thus, it can be seen that gain of the sensitivity function can be lowered around the resonance frequency of 5 kHz while sustaining the stability of the control system.

Figure 20:
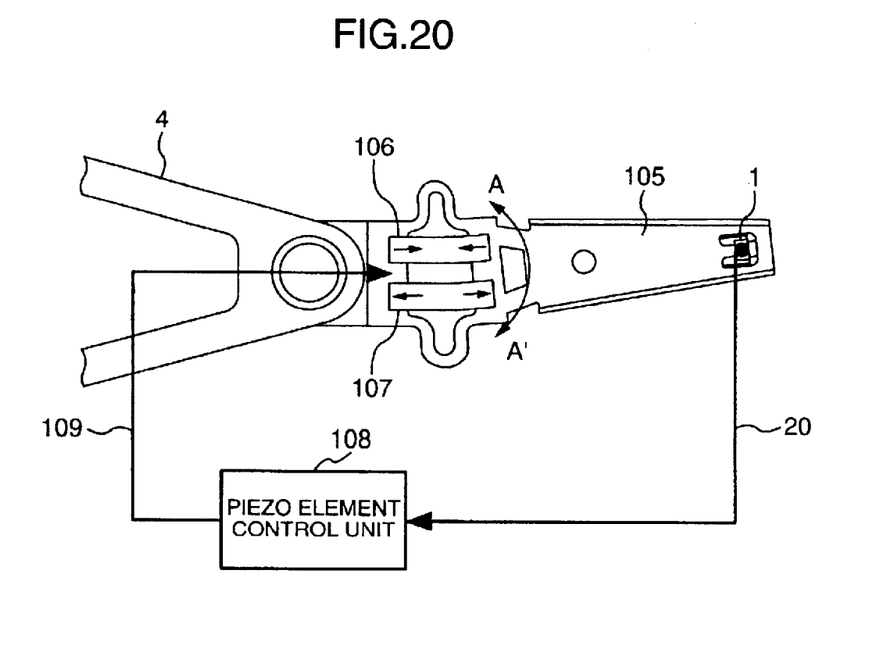
FIG. 20 is a schematic diagram showing a head drive mechanism control unit in which a Piezo element is employed as a fine actuator.

In the case of the head positioning control system shown in FIG. 2, the head driving mechanism unit includes the voice coil motor (VCM) 2 as only one actuator. In the following, description will now be made of the positioning control apparatus for a fine actuator in the case where the head driving mechanism unit actuator is implemented as a two-stage actuator driving system which includes a fine actuator in addition to the voice coil motor (VCM). According to the teaching of the invention incarnated in the instant embodiment now under consideration, the fine actuator is comprised of two Piezo elements mounted on a suspension through which the carriage and the head are coupled to each other. FIG. 20 shows a structure of the fine actuator. As can be seen in the figure, the fine actuator is composed of a head 1, a carriage 4, a suspension 105, a first Piezo element 106, and a second Piezo element 107, wherein the first and second Piezo elements 106 and 107 are controlled by a Piezo element control unit 108.

In the fine actuator now under consideration, the first and second Piezo elements 106 and 107 are caused to expand and contract in response to Piezo element control input signal 109 to thereby move the magnetic head 1 in the directions indicated by arrows A and A' in the figure. In this case, the under-control object is the transfer characteristic of the circuitry extending from the Piezo element control input signal 109 to the head position signal 20 inclusive. It is presumed that this under-control object is considered as a mechanics model $P_c(s)$ composed of one vibration mode and given by the undermentioned expression (6), being made discrete with the zero-order hold by taking into account that the control system concerned is a digital control system.

$$P_c(s) = \frac{a_r}{s^2 + 2\zeta_r \omega_r s + \omega_r^2} \quad (6)$$

At this juncture, the sampling time is represented by Ts. Further, it is assumed, by way of example, that the mode constant $a_r$ is "1", the viscosity coefficient $\omega_r$ is "0.01", the resonance frequency $\omega_r$ is 2×π×8000 [rad/s] and that the sampling time Ts is "50 µs".

The Piezo element control unit 108 is implemented in the arrangement similar to that shown in FIG. 1, wherein the transfer characteristic $C_f(z)$ of the following compensator incorporated therein contains the phase delay characteristic of second order so that the vibration mode of the under-control object is stabilized with the phase and additionally such gain characteristic that the gain-0 dB crossover frequency in the open-loop transfer characteristic of the control system is 2500 Hz.

Figure 21A:
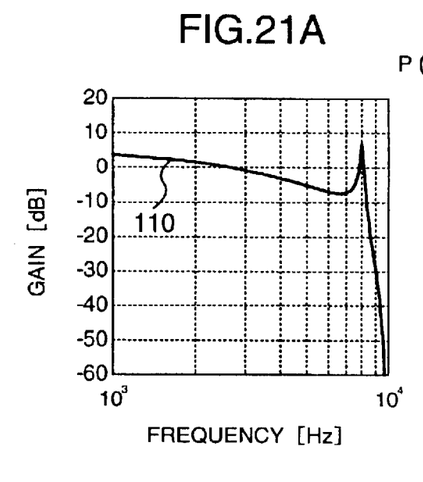
FIGS. 21A and 21B are views for illustrating graphically examples of gain characteristic and phase characteristic, respectively, when the fine actuator representing an under-control object and a following compensator therefor are coupled in series.
Figure 21B:
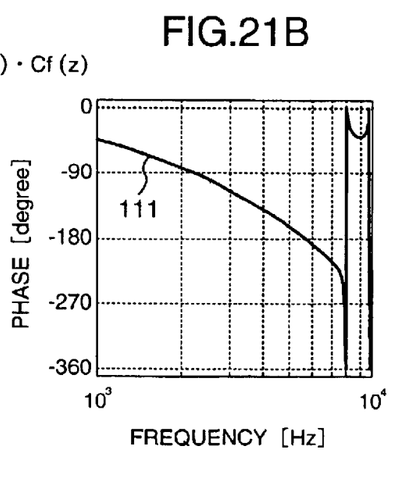
Figure 22:
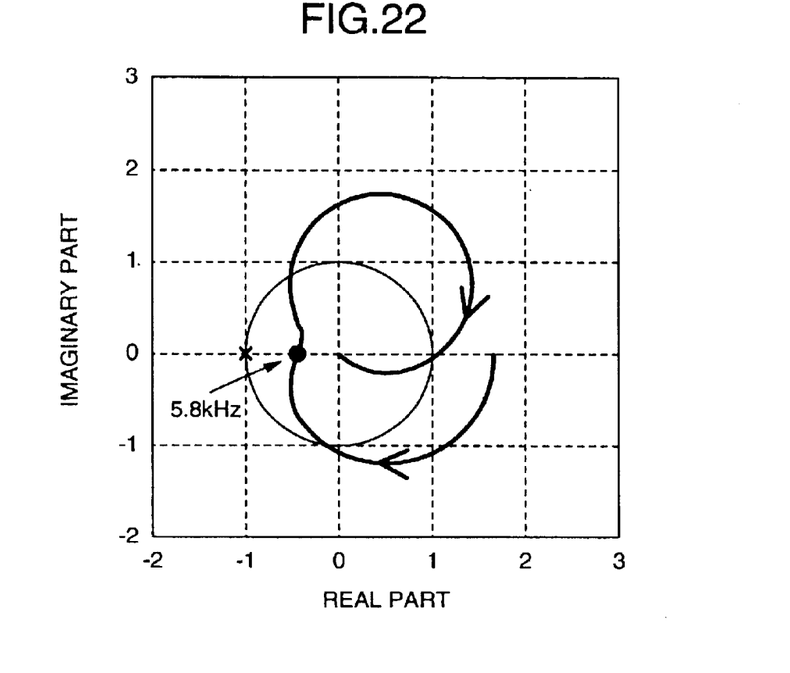
FIG. 22 is a view showing a vector locus of the characteristics shown in FIGS. 21A and 21B.

In this conjunction, FIGS. 21A and 21B show the open-loop transfer characteristics $P(z) \cdot C_f(z)$. More specifically, FIG. 21A illustrates the gain characteristic 110 while FIG. 21B illustrates the phase characteristic 111. Further FIG. 22 shows the vector locus traced by the open-loop transfer characteristic. As can be seen from FIGS. 21A and 21B and FIG. 22, the vibration mode of the under-control object is so stabilized by the following compensator $C_f(z)$ as to run in the upper half plane of the Nyquist diagram. This means that in the frequency range passing through the upper half plane of the Nyquist diagram, the mode whose mode constant is positive has the stable phase condition. On the other hand, in the frequency range passing through the lower half plane of the Nyquist diagram, the mode which is in the opposite phase to the vibration mode and whose mode constant is negative has stable phase condition. In other words, at the frequency lower than the phase−180° crossover frequency (5.8 kHz in the case shown in FIG. 22), the mode whose constant is negative is stable, whereas at the frequency higher than the phase−180° crossover frequency, the mode whose constant is positive is stable.

Figure 23:
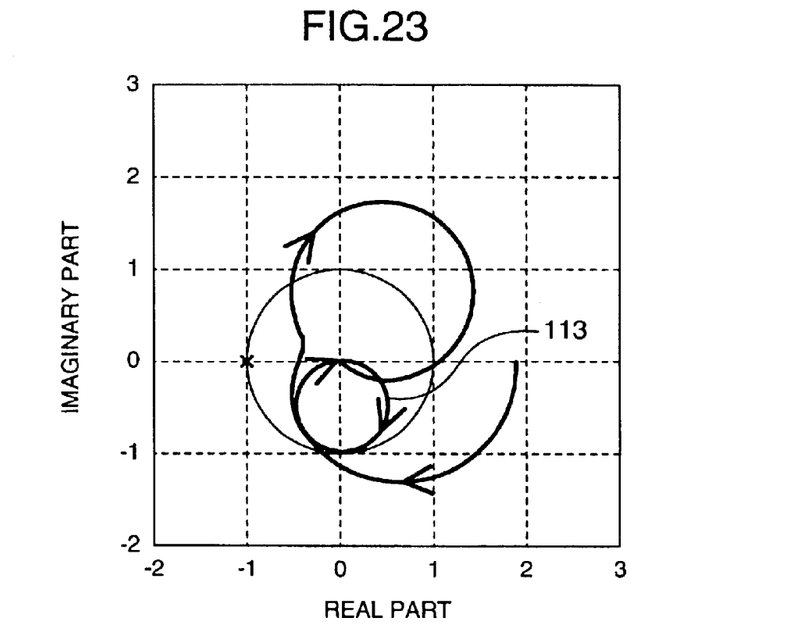
FIG. 23 is a view showing a vector locus of characteristics generated when resonance filter compensation is performed on the vector locus shown in FIG. 22.

At this juncture, it is assumed, by way of example, that the frequency at which the positioning accuracy of the fine actuator is to be improved is 4 kHz. Obviously, the frequency of 4 kHz is lower than the phase−180° crossover frequency of 5.8 kHz. Accordingly, the mode constant a of $C_{pc}(s)$ given by the expression (2) and representing the characteristic of the resonance filter is selected as a negative constant so that the phase becomes opposite to the vibration mode. FIG. 23 shows a vector locus of the open-loop transfer characteristic $P(z) \cdot C_{pf}(z)$ in the case where the mode constant a=−0.02, the viscosity coefficient ζ=0 and the resonance frequency ω=2×π×3950 [rad/s]. As a result, the circular locus 113 on the vector locus which makes appearance owing to the presence of the resonance filter runs clockwise in the direction away from the coordinates (−1, 0) representing an unstable point. Thus, the control characteristic istic around 4 kHz can be improved with the stability of the control system being maintained. Incidentally, in the case where the frequency at which the positioning accuracy is to be improved is, for example, 7 kHz, it goes without saying that the mode constant a of $C_{pc}(s)$ given by the expression (2) is to be selected as a positive constant so that the resonance mode is in phase with the vibration mode.

In the foregoing, the present invention has been described in detail in conjunction with several preferred embodiments on the presumption that the resonance filter as employed is a digital filter which is realized through the processing executed by the MPU 16 shown in FIG. 2. However, the resonance filter may be implement in the form of an analogue filter as well. In this case, the resonance filter is represented by $C_{pc}(s)$ given by the expression (2).

Further, although it has been described that the output of the resonance filter is added to the position signal 20 as shown in FIG. 1, such arrangement may of coarse be adopted that the output of the resonance filter is subtracted from the position error signal PES. Furthermore, in the forgoing description, no consideration has been paid to the influence of dead time included in the under-control object. It should however be mentioned that in some instances, the dead time of the under-control object may exert innegligible influence to the control. To cope with this problem, the dead time can be taken into account in the designing by imparting to the resonance filter the dead time characteristic equivalent to that of the under-control object. In that case, the resonance filter has to be of the third or higher order.

As is apparent from the foregoing description, according to the teachings of the present invention, it is possible in the positioning control system for the magnetic disk apparatus to improve or enhance the positioning accuracy at or around a specific or desired frequency without involving unstability in the control system even in the frequency range where the sensitivity function of the control system is higher than 0 (zero) dB inclusive.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic disk apparatus which comprises an information recording/reproducing medium, a head for recording or reproducing information on or from said information recording/reproducing medium, an actuator for moving said head on said information recording/reproducing medium, and an extraction circuit for extracting a head position signal from the information read out from said information recording/reproducing medium by means of said head, wherein an operating signal is generated for controlling said actuator so that a head position indicated by said head position signal extracted by said extracting circuit coincides with a given target position, said magnetic disk apparatus further comprising a positioning control apparatus for performing a positioning control of said head, said positioning control apparatus comprising:

error detecting means for deriving difference between said given target position and said head position in terms of an error signal, a compensator receiving as input thereto said error signal from said error detecting means for thereby generating said operating signal by carrying out phase compensation for stabilizing a vibration mode existing in an under-control object which is comprised of said actuator, said head and said extraction circuit, and a resonance filter to which said operating signal outputted from said compensator is inputted, said resonance filter having a resonance frequency at or in the vicinity of a given frequency at which positioning accuracy is to be enhanced, the output of said resonance filter being added to said head position signal.

2. A magnetic disk apparatus according to claim 1, wherein in a vector locus representing in a Nyquist diagram an open-loop transfer characteristic when said positioning control apparatus comprised of said compensator and said resonance filter on one hand and said under-control object on the other hand are connected to each other, said resonance filter has such a characteristic that a circular locus is generated clockwise in a direction away from an unstable point (−1, 0) in said Nyquist diagram as the frequency increases in the vicinity of said given frequency at which the positioning accuracy is to be enhanced.

3. A magnetic disk apparatus according to claim 1, wherein said resonance filter is imparted with a transfer characteristic which is given by $$a/(s^2+2\zeta\omega s+\omega^2)$$

where a represents a mode constant, $\omega$ represents a value equal to a product of said resonance frequency multiplied by $2\pi$, and $\zeta$ represents a viscosity coefficient.

* * * * *